US007779864B2

(12) United States Patent
Mazzei

(10) Patent No.: US 7,779,864 B2
(45) Date of Patent: Aug. 24, 2010

(54) INFUSION/MASS TRANSFER OF TREATMENT SUBSTANCES INTO SUBSTANTIAL LIQUID FLOWS

(76) Inventor: Angelo L. Mazzei, 500 Rooster Dr., Bakersfield, CA (US) 93307

( * ) Notice: Subject to any disclaimer, the term of this patent is extended or adjusted under 35 U.S.C. 154(b) by 317 days.

(21) Appl. No.: 11/895,805

(22) Filed: Aug. 27, 2007

(65) Prior Publication Data

US 2009/0056812 A1 Mar. 5, 2009

(51) Int. Cl.
*G05D 11/035* (2006.01)

(52) U.S. Cl. ............................ 137/599.03; 137/599.12; 137/890; 137/896

(58) Field of Classification Search ............ 137/599.12, 137/599.03, 89, 101.11, 890, 896
See application file for complete search history.

(56) References Cited

U.S. PATENT DOCUMENTS 2,353,865 A * 7/1944 Armstrong .................. 137/584
2,680,715 A * 6/1954 Cook ......................... 137/114
3,612,087 A * 10/1971 Roland ........................ 137/93
3,788,825 A * 1/1974 Arenson ..................... 62/52.1
3,913,617 A * 10/1975 van Laar et al. ........ 137/599.01
3,946,993 A 3/1976 Marlin
4,123,800 A 10/1978 Mazzei
4,150,817 A * 4/1979 Regelin et al. .............. 137/896
4,647,212 A * 3/1987 Hankison ................. 366/165.5
4,722,363 A * 2/1988 Allyn .................... 137/601.18
5,622,545 A 4/1997 Mazzei
5,674,312 A 10/1997 Mazzei
5,863,128 A 1/1999 Mazzei
5,894,995 A 4/1999 Mazzei
6,000,418 A 12/1999 Kern, Jr. et al.
6,623,154 B1 9/2003 Garcia
6,685,825 B1 2/2004 Chang
6,726,354 B1 4/2004 Breuer et al.
6,730,214 B2 5/2004 Mazzei
6,796,704 B1 9/2004 Lott
6,896,401 B2 5/2005 Wolfert et al.
7,357,565 B2 4/2008 Gopalan et al.
2003/0015481 A1 1/2003 Eidem
2009/0314702 A1 12/2009 Mazzei

* cited by examiner

*Primary Examiner*—Stephen Hepperle
(74) *Attorney, Agent, or Firm*—James M. Duncan, Esq.; Klein, DeNatale, et al.

(57) ABSTRACT

Process and equipment for rapid and reliable infusion of treatment substances into a liquid mainstream. The equipment includes diversion of some of the liquid, boosting its pressure into an aspirating injector, which adds treatment substance and in turn discharges to a pair of opposed nozzles that inject the diversion stream with treatment substances back into the mainstream flow.

6 Claims, 4 Drawing Sheets

INFUSION/MASS TRANSFER OF TREATMENT SUBSTANCES INTO SUBSTANTIAL LIQUID FLOWS

FIELD OF THE INVENTION

A hydraulic system for infusing a treatment substance into liquid flowing through a conduit at a substantial volumetric rate with rapid and uniform mixing into the liquid is disclosed.

BACKGROUND OF THE INVENTION

While this invention is applicable to the treatment of many kinds of liquid, its principal usage will be in the field of water treatment in substantial installations, for example municipal and regional water supplies where the flow rate is on the order of at least about 500 gallons per minute, and generally much higher.

Treatment substances may be of any character, gas, liquid, or slurries. One well-known example is the use of ozone to treat water flowing through a large pipe often on the order of 48 inches in diameter. The object of this invention is to infuse the treatment substance (mass transfer) into the flowing stream in such arrangement and with such equipment that the treatment substance very quickly diffuses throughout substantially the entire cross-section of the flow. Thus a quick and reliable treatment is attained, without the need to "over-dose" the stream in order to be assured of a sufficiency throughout the treated liquid.

Very detailed analyses of flow patterns and distribution have been made to establish the effectiveness of this system.

Acceleration of mass transfer of a gas into a liquid is the subject of prior efforts, including some by the inventor herein. For example, in Mazzei U.S. Pat. No. 5,764,312 (the '312 patent) issued May 4, 2004 a liquid stream containing treatment gas emits from an aspirating injector into a collider. In this collider the total stream is split into two streams, which are combined in a collider chamber in which each split stream collides directly with the other, and the two streams continue as one to a point of use or storage.

Aspirating injectors (sometimes called "mixer injectors") for use in the '312 patent and in this invention are fully disclosed in Mazzei U.S. Pat. No. 4,123,800, (the '800 patent) issued Oct. 31, 1978 and U.S. Pat. No. 5,863,128, issued Jan. 26, 1999 (the '128 patent).

An infusion nozzle useful in this invention is fully disclosed in Mazzei U.S. Pat. No. 5,894,995, issued Apr. 20, 1995 (the '995 patent).

The '312, '800, '128, and '995 patents are incorporated herein in their entirety by reference for their disclosures of structure, method and use as though presented herein in their entirety.

The '800 patent shows the essentials of an aspirating injector. It includes a constricting portion of decreasing diameter, an expanding portion of increasing diameter and between them a throat portion. A port discharges a treatment substance into the throat portion, which is at a lower pressure than its adjoining portions.

The walls of the portions in the '800 patent are smooth and uninterrupted. The corresponding walls in the '128 patent include vanes projecting inwardly from the walls. The vanes in the constructing portion give a twist to part of the stream, and vanes in the expanding portion straighten out the existing stream. These vanes are optional but preferred. Either construction is suitable for use in this invention.

The '995 patent shows a constricting nozzle with twisting vanes. This is preferred for this invention, but a constricting nozzle as shown in the '995 patent without the vanes, but identical otherwise, is within the scope of this invention.

It is an object of this invention to obtain an accelerated mass transfer of treatment substance into a flowing stream without the cost, complication, and energy loss caused by splitting and recombining the total stream.

BRIEF DESCRIPTION OF THE INVENTION

An infusion system according to this invention is used along with a conduit (pipe), usually a circular-sectioned pipe with a peripheral wall, an entry and an exit with major flow of liquid to be treated flowing uninterrupted from entry to exit. The flow is expected to be steady and smooth.

A diversion conduit exits from the pipe at an upstream location. A pump receives liquid from the diversion conduit and boosts its pressure. The outlet of the pump discharges to an aspirating injector, which receives treatment substance, mixes it into the diversion stream and discharges the mixed diversion stream to a pair of nozzles which in turn inject the mixed stream back into the main flow.

These nozzles are preferably opposed to one another with their axes co-axial, and intersecting the central axis of the pipe.

The mixed diversion flow quickly infuses and distributes into the main flow. The main flow has not been disturbed as it is in the '214 patent.

In the preferred but optional system, a plurality of pairs of nozzles are provided, all supplied from a common manifold downstream from a single aspirating injector.

In yet another suitable arrangement a plurality of pairs of nozzles are provided with an aspirating injector individual to each pair.

The above and other features of this invention will be fully understood from the following detailed description and the accompanying drawings, in which:

DETAILED DESCRIPTION OF THE INVENTION

Figure 1:
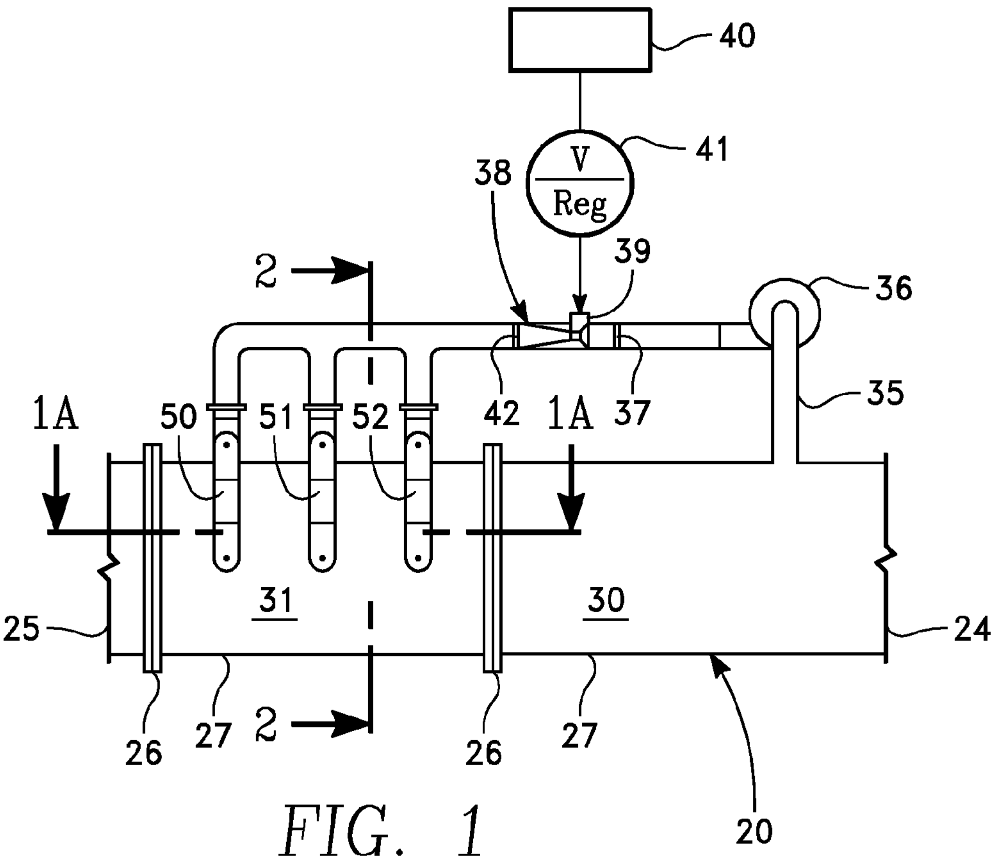
FIG. 1 is a side elevation of the invention applied to a pipe.

FIG. 1 illustrates the invention applied to a conduit 20 which as shown is a pipe with a cylindrical wall 21 forming a flow passage 22 with a central axis 23. For convenience in disclosure, end 24 is regarded as an upstream, inlet, end and end 25 is regarded as a downstream, outlet, end related to the devices of this invention.

Flanges 26 are shown by means of which segments 27 can be installed in the completed pipe.

The main flow of liquid, in this example water, flows from inlet to outlet. In operation, pipes of this type (the illustration being of a 48 inch diameter pipe) operates full, and the stream usually flows at the axial rate of about 3 to 5 feet per second.

This is a very substantial flow of water, and injection/infusion to treatment substances must be quick and reliable.

An examination of FIG. 1 will show that there is a negligible, if any, pressure drop between the upstream region 30 and the downstream region 31, related to the infusion apparatus yet to be described. Accordingly, this invention causes negligible energy loss from or disruption of the main flow.

The object of this invention is to provide, between regions 30 and 31 the infusion of the treatment material with the intended results. For this purpose, a diversion conduit 35 is provided for the injection of treatment substance.

Pump 36 draws a diversion stream from the main flow and boosts its pressure. In any event it is sufficient to operate an aspirating injector and to return the diversion stream to the mainstream. In most applications, the raise in pressure will be about 30 psi. After the pump, the diversion stream extends to the inlet port 37 of an aspirating injector 38 which will be described in greater detail below.

Aspirating injector 38 includes a port 39 which receives a proportioned supply of treatment substance from source 40. A regulator valve 41 passes the substance at a controlled pressure to port 39. Most frequently the treatment substance will be a gas.

Figure 2:
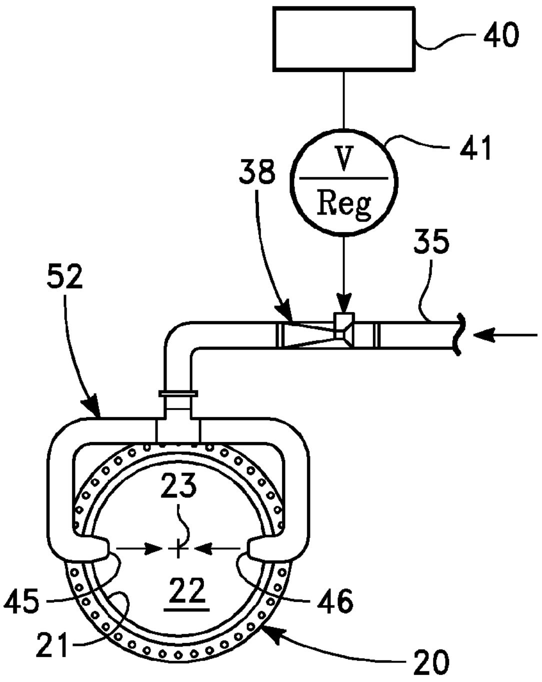
FIG. 2 is a cross-section taken at line 2-2 in FIG. 1.
Figure 1A:
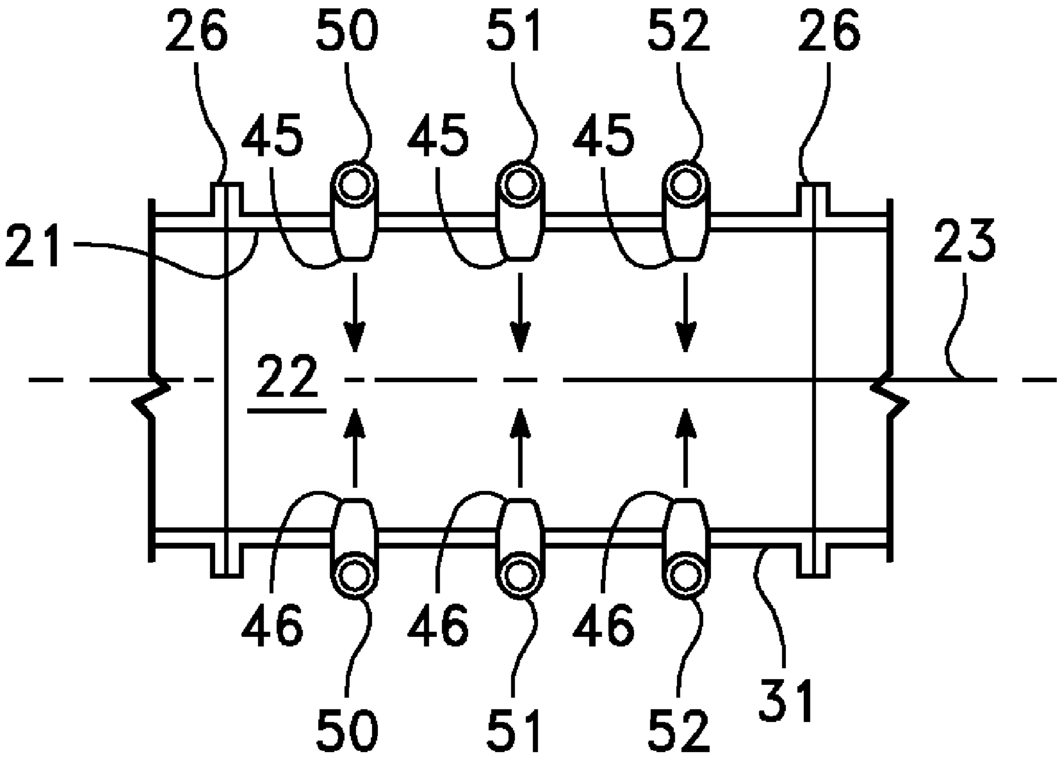

The diversion conduit continues from the outlet end 42 of the aspirating injector to at least one pair of nozzles 45,46 (FIG. 2). These nozzles receive an identical supply of treatment substance, and may be regarded as manifolded.

Figure 3:
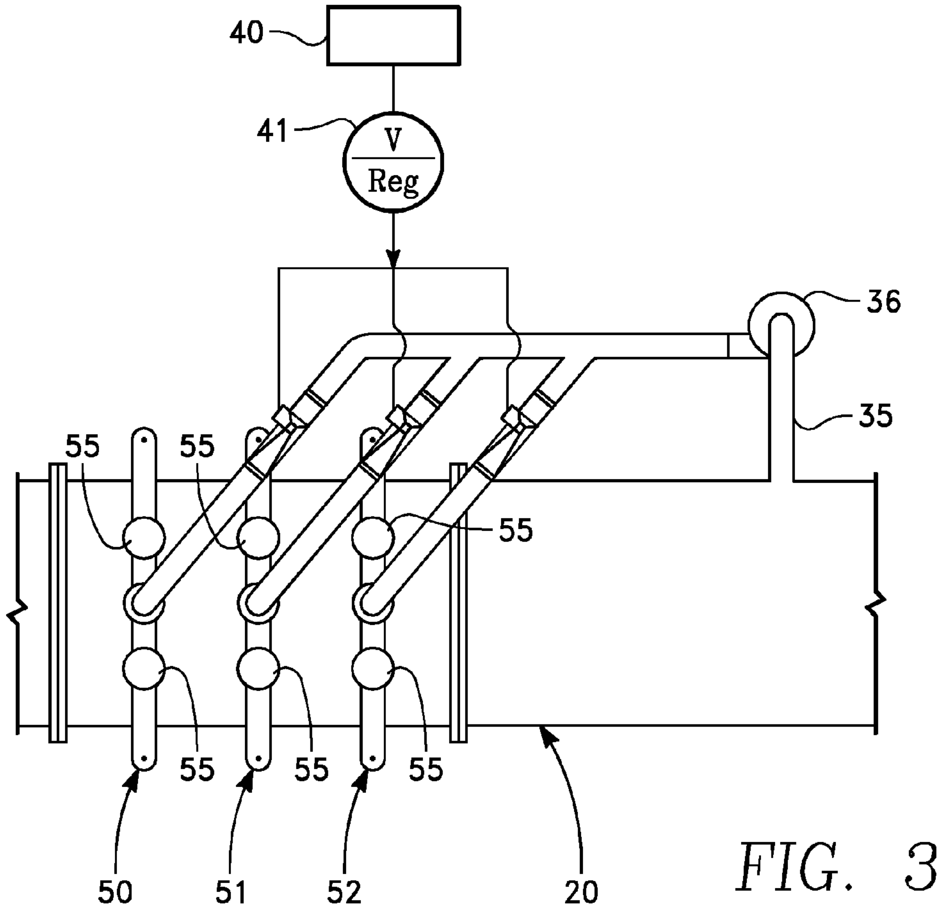
FIG. 3 is a top view of another embodiment of the invention.

As best shown in FIG. 1 a plurality of pairs of nozzles 50,51,52 may be manifolded from the diversion conduit. Thus one pair or a plurality of pairs of these nozzles may be used. In addition, as shown in FIG. 3, valves 55 may be inserted just upstream from each nozzle so that the nozzles can be individually or in pairs cut off from the supply of treatment substance. Occasionally this may be desirable.

FIG. 1 illustrates that a single aspirating injector can be utilized for all of the nozzles. FIG. 3 shows that if desired a respective aspirating injector can be provided for each pair. The system size and capacity will determine whether more of the aspirating injectors, or only one will be used. Apart from this, the systems of FIGS. 1 and 3 are identical and identical numbers are used to identify their parts.

Figure 4:
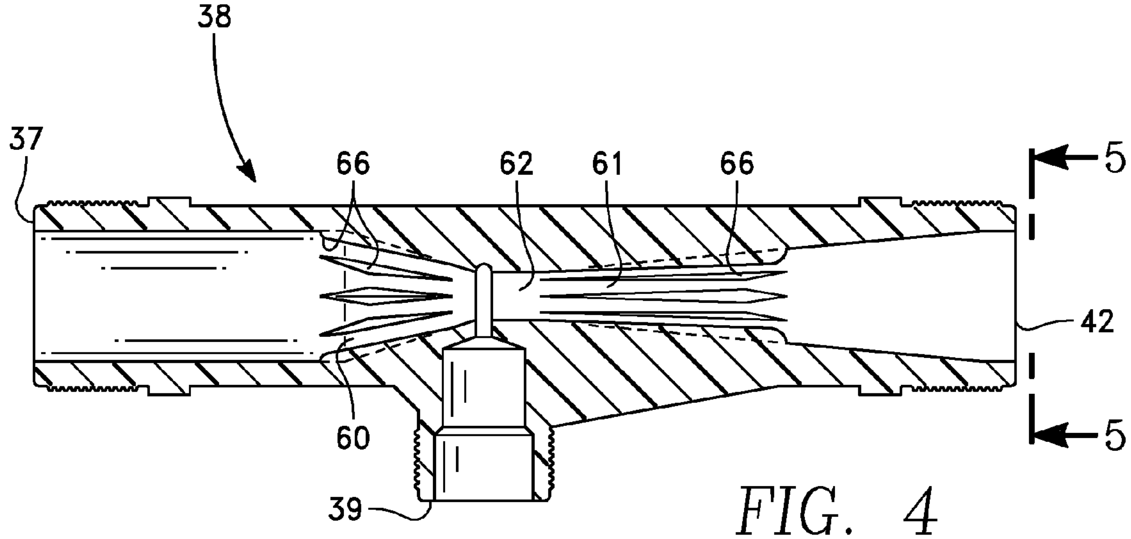
FIG. 4 is an axial cross-section of a mixer-injector useful in this invention.
Figure 5:
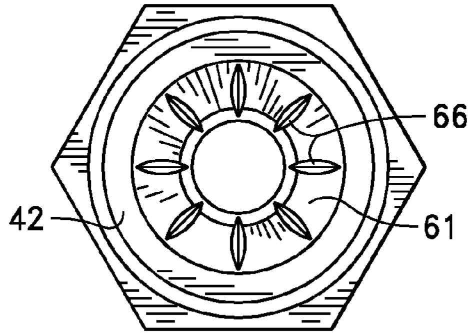
FIG. 5 is an end view taken at line 5-5 in FIG. 4.

FIGS. 4 and 5 illustrate aspirating injectors 38 in detail. These will be recognized as drawing Figs. in Mazzei '128 to which reference is made for more detailed understanding of its functions. Inlet port 37 and outlet port 42 are plumbed into the diversion conduit. Port 39 is connected to the source 40 of treatment substance.

Constricting portion 60 receives liquid from the diversion conduit. Expanding portion 61 discharges downstream in the diversion conduit. A cylindrical injection portion 62 receives the treatment substance.

Constricting portion 60 as illustrated includes twisting vanes 66 which provide a small twist to the outer portion of the diverted stream.

Expanding portion 61 as illustrated includes straightening vanes 66 which straightens the outer region of the flow.

These vanes are optional, and the two portions can instead be smooth as shown in the Mazzei '800 patent.

Figure 6:
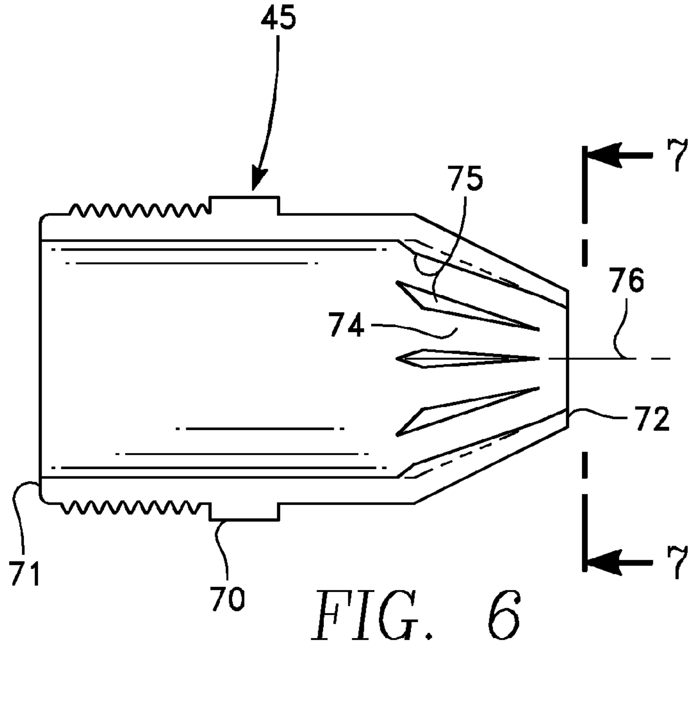
FIG. 6 is an axial cross-section of a nozzle useful in this invention.
Figure 7:
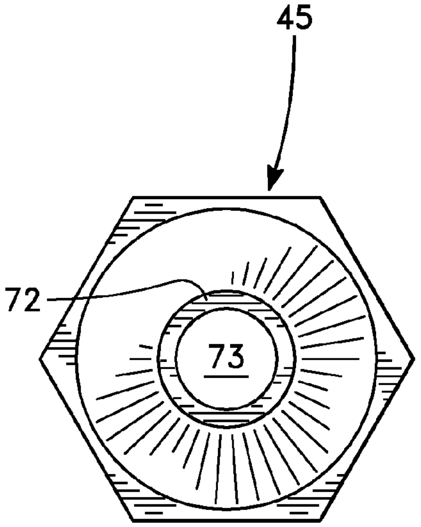
FIG. 7 is an end view taken at line 7-7 in FIG. 6.

FIGS. 6 and 7 illustrate nozzles 45 and 46. These nozzles will be recognized as those described in the Mazzei '995 patent to which reference may be had for further disclosure of the properties of the nozzle.

Nozzle 45 (nozzle 46 is identical) has a body 70 with an inlet end 71 a discharge end 72 and a flow passage 73. At its discharge end there is a constricting portion 74 to increase the velocity of the discharge along the nozzle axis 76.

Portion 74 as illustrated includes twisting vanes 75 to provide a circular component to part of the stream. These vanes are optional and may be eliminated. Then portion 74 would be a smooth uninterrupted conical section.

The operation of this system is straight-forward. Its objective is to infuse into a substantial liquid flow a properly-proportioned amount of treatment substance in a condition to be quickly distributed throughout the cross-section of pipe 20. This would seem to be a straight-forward matter until the intended environment is fully considered. Basically it is a large flowing body, usually water in the form of a swift current.

One instinctively thinks of such things as diffusers and mixing devices. In this environment such means tend to impede the flow, cause turbulence and energy loss. In contrast, this invention involves only pairs of opposing nozzles (as this phrase is used herein) which directly inject a stream of pre-conditioned treatment material into the main stream without causing turbulence or obstruction.

The question must arise, as it has, whether such an injection stream can really be so properly dispersed as the consequence of its interaction with the main stream and with an opposite stream from another similar source (nozzle). When this invention is utilized, the answer is yes. Very complicated tests have been made to determine the destination in the mainstream of these injected streams. The data indicates that with proper parameters, the treatment material is quickly and uniformly taken into the mainstream.

The treatment substances can vary in kind. Generally when water is being treated, a gas will be provided. At the present time ozone (pure or as a component of a group of gases), chlorine or bromine are of major consideration. Various solids provided in sludge or slurry form are also useful, but not as convenient.

The function of the aspirating injector is to take the concentrated treatment substance into an already dispersed condition before it finally is injected into the mainstream. The aspirating injector has the property of taking the substance and injecting it into the diversion stream in the form of discreet bubbles often micro-bubbles or particles which upon injection into the mainstream are already partly or entirely into solution or suspension.

After the diversion flow leaves the aspirating injector, it flows through the nozzle into the mainstream. At this time one of the principal advantages of this invention occurs. The nozzles are provided in pairs, each nozzle being directed into the mainstream at a velocity that is intended to cause at least some of it to pass across an axial plane normal to its flow.

It is not necessary, although it is preferable, for the nozzle to be directed normally to the central axis, and for it to be co-axial with its partner nozzle across the axis. The nozzles of each pair are located at opposite locations along the pipe. Then the two streams will "collide" to the extent that they have not already been assimilated in the stream. It is preferably that the flow through each nozzle is about equal.

The nozzles are shown as a "battery". When all pairs are functioning, the main flow will pass three sets of pairs which are injecting diversion stream liquid into the stream. If fewer than all pairs are needed, then appropriate valves 55 will be closed.

Also, in every arrangement the nozzles need not be directed normally to the mainstream axis or directly at the opposite nozzle. Instead the nozzle axes could be set so that their discharge is somewhat upstream or downstream by a small angle. In any event it is usually best practice for the nozzle axes to cross an axial plane that is normal to it.

As an example, in a 48 inch diameter pipe, a 4 inch nozzle will be used, and an aspirating injector of size suitable for the intended flow will be provided. These numbers may be scaled for different installations. Suitable nozzles and aspirating injectors may be obtained from Mazzei Injector Corporation, 500 Rooster Drive, Bakersfield, Calif. 93307.

In summary, the treatment substance is first aspirated into a diversion flow and then injected through a nozzle into the mainstream flow (from which the diversion flow was taken and pressurized). The result is an importantly improved infusion of the treatment substance into the mainstream.

This invention is not to be limited by the embodiment shown in the drawings and described in the description, which is given by way of example and not of limitation, but only in accordance with the scope of the appended claims.

I claim:

1. In combination with a pipe, said pipe having a cylindrical wall with a central axis, providing for a substantial flow of liquid including flow from an upstream location to a downstream location, apparatus to infuse a treatment substance into a mainstream flow of liquid, said apparatus comprising:

(a) a diversion conduit for externally providing a diversion flow of liquid from said upstream location to said downstream location, said diversion conduit receiving liquid from said mainstream;

(b) a booster pump receiving said diversion flow and boosting its pressure;

(c) an aspirating injector receiving diversion flow from said pump and injecting a proportioned amount of treatment substance into said downstream conduit; and (d) a plurality of pairs of nozzles, each pair being spaced apart linearly from its adjacent pair or pairs, each nozzle having an axis, each nozzle receiving a substantially equal portion of said diversion flow with treatment substance, each nozzle so disposed and arranged as to inject its respective stream into said pipe in the general direction of the opposite member of its pair of nozzles.

2. Apparatus according to claim 1 in which said aspirating injector includes a constricting portion, an expanding portion, and an intermediate injection portion, said treatment substance being drawn into the injection portion by reduced pressure caused by stream flow from the constricting to the expanding portion.

3. Apparatus according to claim 1 in which one aspirating injector supplies a plurality of pairs of nozzles.

4. Apparatus according to claim 1 in which an aspirating injector is provided for each pair of said nozzles.

5. Apparatus according to claim 1 in which the axes of each corresponding pair of nozzles are substantially co-axial.

6. Apparatus according to claim 1 in which the axes of said nozzles are at an acute angle with one another.

* * * * *